Dec. 18, 1934.     L. E. SAUER     1,984,996
VENTILATING MEANS FOR ELECTRICAL WINDINGS
Filed Jan. 14, 1933
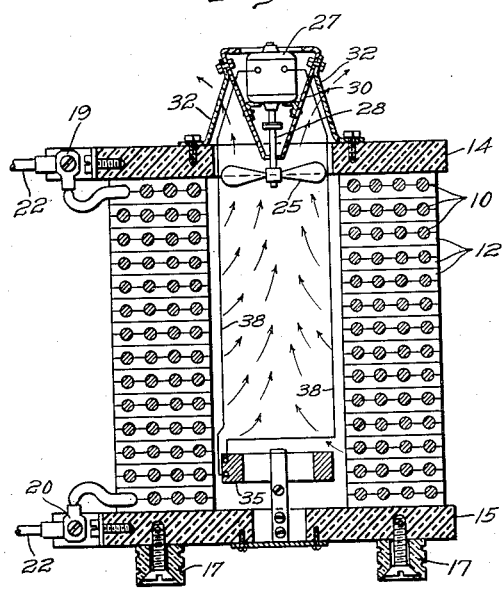
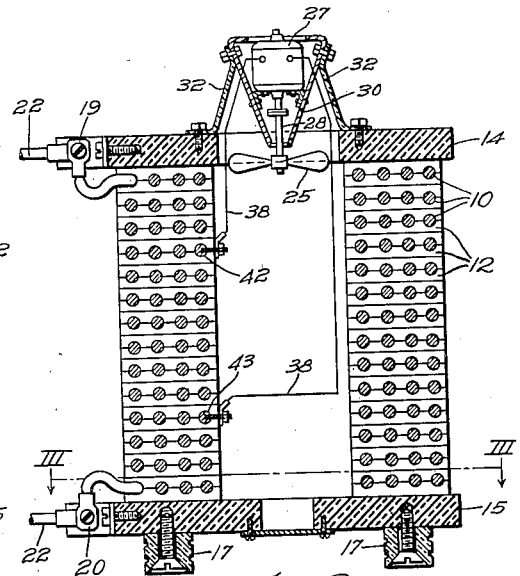
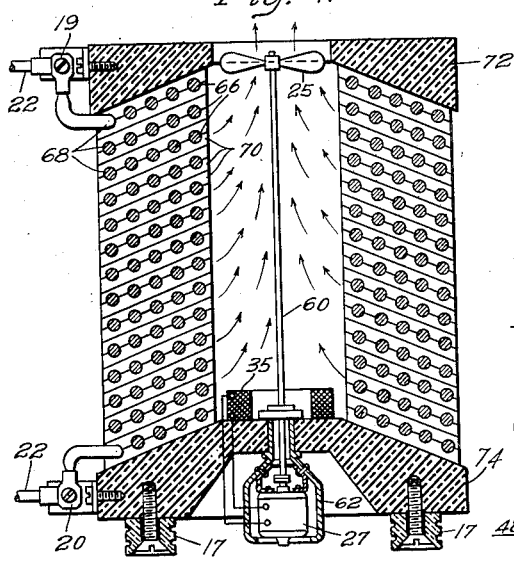
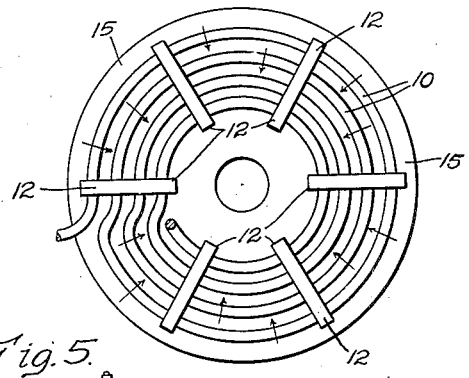
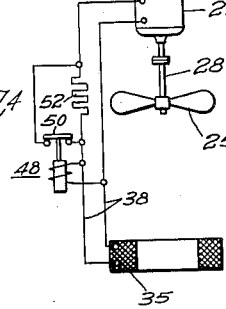
WITNESSES:
INVENTOR
Louis E. Sauer.
BY
Franklin E. Hardy
ATTORNEY Patented Dec. 18, 1934

1,984,996

UNITED STATES PATENT OFFICE 1,984,996

VENTILATING MEANS FOR ELECTRICAL WINDINGS

Louis E. Sauer, Sharon, Pa., assignor to Westinghouse Electric & Manufacturing Company, East Pittsburgh, Pa., a corporation of Pennsylvania Application January 14, 1933, Serial No. 651,727

12 Claims. (Cl. 175—359)

My invention relates to the ventilation of electrical windings, and it has particular relation to a forced air cooling system for current-limiting reactors and other windings the current-flow through which is of a variable or intermittent nature.

It is usual to connect current-limiting reactors in circuit with the conductors of an alternating-current power system to prevent the current therein from increasing to unsafe values upon the occurrence of short circuits or during other abnormal conditions. I refer particularly to so called air core reactors which do not employ iron core members, and which comprise copper conductors or strands that are spaced from one another in order to provide spaces for the circulation of cooling air. Since it is usually uneconomical to provide a separate cooling system for power limiting reactance windings, it has heretofore been necessary to make such windings of large size in order to have normal heat radiating capacities that are sufficient to preclude dangerous temperature rises during conditions of abnormal loading, that are generally intermittent. Such windings occupy a considerable amount of space and have been expensive to manufacture.

One object of my invention is to facilitate the ventilation of electrical windings which are disposed to carry currents of an intermittent or widely varying nature.

Another object of my invention is to reduce the cost and size of current-limiting reactance coils required by a given application.

A further object of my invention is to provide a forced-ventilating system for electrical windings which supplies a cooling action at all times commensurate with the heat generated in the winding.

An additional object of my invention is to provide a ventilating system for an electrical winding of the type described which receives its energy from the winding and which is completely automatic in its operation.

In practicing my invention, I provide a ventilating-fluid propeller, preferably in the form of a fan, which is driven by a motor the energizing circuit for which is supplied by a voltage having a magnitude that directly depends upon that of the current carried by the winding to be ventilated. The fan is thus operated only when the winding carries current and at a speed which increases as the winding current increases. By this provision of an automatically operated cooling mechanism the size of the winding conductors may be substantially decreased, and the cost of manufacture of and space required by the winding is correspondingly reduced. Furthermore, the necessity of relying upon an operator to attend to the winding ventilation is done away with.

My invention, together with additional objects and advantages thereof, will best be understood from the following description of specific embodiments when taken in conjunction with the accompanying drawing in which:

Figure 1 is a view, partly in elevation and partly in section, of an electrical winding employing the automatic cooling system of my invention;

Fig. 2 is a similar view illustrating an electrical winding embodying a modified form of my invention;

Fig. 3 is a sectional view taken on line III—III of Fig. 2 showing the arrangement of conductor turns and supports therefor utilized by the windings of Figs. 1 and 2;

Fig. 4 is a view, partially in elevation and partially in section, of a winding which is especially adapted to accommodate the automatic cooling equipment of my invention, and Fig. 5 is a diagrammatic representation of the energizing circuit for the fan driving motor showing an over-voltage protective equipment associated therewith.

Referring to the drawing, it will be noted that the electrical windings illustrated in Figs. 1 and 2 are identical, each being a well-known type of current-limiting reactance coil comprising a plurality of discoidal layers 10 of conductor turns stacked on top of each other and supported in position by apertured horizontal spacing members 12 arranged in stacks or groups, all of which are disposed radially from the center line of the structure as is more clearly illustrated by the showing of Fig. 3. Top and bottom end plates 14 and 15 formed of suitable insulating material, are provided for the structure in the manner shown, which structure may be supported by insulator feet 17. The reactor is connected to the conductors 22 of the alternating current power circuit, the current of which is to be limited by the coil, by means of terminals 19 and 20 attached to the top and bottom end plates respectively.

While a discoidal layer cylindrical winding has been illustrated that is disposed for mounting with its axis vertical and adapted for air ventilation, it will become apparent that the cooling system of my invention about to be described is not limited in its application to this particular type of structure.

The cooling of the winding illustrated is effected by the passage of air from around the coil between the spaced winding turns and upwardly through the central opening, as indicated by the arrows in the several figures. In the absence of artificial circulating means, natural convection currents must be depended upon to move the air, which natural currents are frequently inadequate for this purpose when the current passed through the winding is high.

To improve the winding ventilation, I contemplate placing a fan 25 or other ventilating fluid propeller in the central opening of the winding, preferably near the top. A motor 27, adapted for alternating-current energization, is mounted above the fan and connected to drive it by means of a shaft 28, preferably of insulating material. To shield the motor from the stray winding flux which becomes intense for high currents, I surround it by a shield 30 of conducting material shown in the form of a conical structure through the apex of which fan shaft 28 extends. The shield 30 may be either of non-magnetic conducting material such as brass, copper or the like, or, when the maximum effectiveness is desired, of magnetic material such as iron or steel. The entire motor assembly is illustrated as supported from the top end plate 14 of the winding by means of suitable bracket members 32.

To supply an energizing voltage to motor 27 which is dependent upon the winding current, an auxiliary or pick-up winding 35 positioned in the path of the main winding flux may be employed. The voltage induced in pick-up winding 35 is impressed upon the fan motor by means of conductors 38, and will be seen to be directly proportional to the magnitude of current carried by this main winding or reactance coil. The speed of the fan 25 driven by the motor 27 will, therefore, increase as the reactance-coil current rises and will cause a greater volume of cooling air to be drawn between the coil turns, thereby preventing the temperature from rising excessively, as it otherwise would were the fan speed not to increase. It will be apparent that when the current carried by the coil is decreased to zero, the fan motor comes to a complete stop since its energizing voltage is also reduced to zero.

An alternative manner of supplying the motor is illustrated in Fig. 2 in which the fan motor 27 is shown as being connected between two points 42 and 43 of the main reactance coil. Since the potential difference between these two points in the winding is a direct function of the current carried thereby, the automatic feature pointed out in connection with the system of Fig. 1, is attained by energizing the motor from the reactor winding.

The fan motor circuit may be modified in the manner indicated in Fig. 5 to protect the motor from over-voltage during periods when the reactance coil current is excessively high. A voltage responsive relay 48 that is influenced by the voltage appearing between conductors 38 is provided. When this voltage is of a safe value, as during normal reactance coil currents, the relay remains in its closed position, as illustrated, in which position a contact member 50 shunts a resistance 52 and completes a direct energizing circuit for the motor. The passage of an excessive current through the reactance coil increases the voltage between conductors 38 to a value sufficient to cause relay 48 to move contact member 50 upwardly, thereby interrupting the shunt circuit around the impedance 52 through which impedance the motor energizing current must now flow. The voltage impressed upon the motor 27 is therefore prevented from increasing above a safe value during abnormal loading of the reactance coil.

In those instances in which head room is at such premium that the slight increase in over-all height of the reactance coil which the installation of the fan motor assembly shown in Figs. 1 and 2 necessitates is objectionable, the form of assembly illustrated by Fig. 4 will find ready application. In Fig. 4 the fan motor 27 is mounted at the lower end of the reactance coil to be ventilated and connected by means of an extended insulating material shaft 60 with the air circulating fan 25 positioned near the top of the coil assembly. The motor is shown as being energized from a pick-up winding 35 positioned in the path of main coil flux as in the system of Fig. 1. A magnetic shield 62 is also shown surrounding the motor.

The main winding shown in Fig. 4 is constructed in accordance with the teachings of a copending application Serial No. 651,728 by H. B. West and myself filed January 14, 1933, and assigned to the same assignee as this invention. In accordance with these teachings, the axially spaced layers of conductor turns comprised by the winding are disposed in the form of interfitting conical sections to facilitate the circulation of ventilating air between the winding turns. Thus, in Fig. 4 the inner conductors 66 are at higher elevations than are the outer conductors 68, the intermediate ones being at intermediate elevations in line with the inner and outer ones. Apertured spacing members 70 are employed to hold the conductors in this desired position and may be disposed at appropriate points around the circumference of the coil in a manner similar to the spacing of members 12 illustrated in Fig. 3. The required sloping of these spacing blocks is maintained by an appropriate beveling of the top and bottom end members 72 and 74 of the coil.

Because of the somewhat elevated center of the structure which the mounting of the fan motor at the lower end thereof requires the positioning of the main conductors of the reactance coil in the downwardly sloping manner as the outside of the structure is approached is advantageous in that it reduces the over-all height of the complete assembly.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. In combination, an electrical winding disposed to carry an alternating current, a ventilating system therefor comprising a propeller for forcing cooling fluid through the winding, a motor for driving the propeller, an auxiliary winding magnetically coupled to said main winding, and a circuit for connecting the motor to the auxiliary winding to effect energization therefrom.

2. A ventilating system for an electrical winding connected in an alternating-current circuit comprising, in combination, a propeller for forcing cooling fluid through the coil, a motor for driving the propeller, and a source of energization for the motor comprising an auxiliary winding magnetically coupled with said reactance coil in a manner that there is induced therein a voltage that is substantially proportional to the electrical winding current, and a circuit for connecting the motor to the auxiliary winding.

3. In combination with an electrical winding disposed to carry current, a propeller for forcing cooling fluid through the winding, a motor for driving the propeller, and a circuit for energizing the motor in accordance with the winding current, and means for protecting the motor from over-voltage comprising an impedance, and a relay responsive to the intensity of magnetic flux set up by the winding for inserting said impedance in the motor-energizing circuit when said flux intensity exceeds a given value.

4. In combination, an electrical winding disposed to carry current, a propeller for forcing cooling fluid through the winding, a motor for driving the propeller, and a circuit for energizing the motor in accordance with the current in said winding, means for protecting the motor from over-voltage comprising an impedance, and a relay disposed to insert said impedance in the motor circuit when the current in said electrical winding exceeds a given value.

5. In combination, a current-limiting reactance coil, a fan for cooling the coil, a motor, mounted in the path of magnetic flux produced by the coil, for driving the fan, and means for shielding the motor from the said coil-flux.

6. In combination, an electrical winding disposed to carry current, a fluid propeller for cooling the winding, a motor for driving the propeller, said motor being disposed in the path of the magnetic flux which the winding produces, and a shield of magnetic material disposed to surround the motor in a manner to by-pass said flux away from the motor.

7. In combination, an electrical winding disposed to carry an alternating current, a fan cooling the winding, a motor disposed in the path of the magnetic flux produced by the winding for driving the fan and a shield of conducting material disposed to surround the motor in a manner to prevent said flux from influencing it.

8. In combination, an electrical winding disposed to be mounted with its longitudinal axis thereof substantially vertical, a ventilating fan disposed in the central opening of the winding, a motor for driving the fan mounted at the upper end of said winding with the axis thereof substantially coincident with the winding axis, and a magnetic shield surrounding the motor.

9. In combination, an electrical winding having a central opening mounted with its longitudinal axis substantially vertical, a ventilating fan disposed in the central opening of the winding, a motor for driving the fan mounted at the lower end of said winding with the axis thereof substantially coincident with the winding axis, and a magnetic shield surrounding the motor.

10. In combination, an electrical winding, a fan for cooling the winding, a motor for driving the fan, a pick-up coil mounted with its axis substantially coincident with that of the winding for supplying power to said motor, and a circuit connecting the motor to said pick-up coil.

11. In combination, an electrical winding, a ventilating fan disposed in the central opening of the winding, a motor mounted with the axis thereof substantially coincident with the winding axis, and an insulating material shaft for mechanically connecting the motor and the fan.

12. In combination, an electrical winding, disposed to be mounted with the axis thereof substantially vertical, comprising a plurality of axially disposed layers of conductor turns, said layers being spaced apart to permit the flow of ventilating fluid therebetween and each comprising a plurality of radially disposed turns, the inner turn of each layer being positioned at a higher elevation than the outer turn and the intermediate turns being positioned at intermediate elevations in line with the said inner and outer turns, a ventilating fan disposed in the central opening of the winding near the upper end thereof, a motor mounted at the lower end of the winding substantially in line with the axis thereof, a shaft for connecting the motor and the fan, and means for shielding the motor from the magnetic field of the winding.

LOUIS E. SAUER.